United States Patent

Hall et al.

[11] Patent Number: 5,831,731
[45] Date of Patent: Nov. 3, 1998

[54] APPARATUS AND METHOD FOR COMPARING OPTICAL BITS

[75] Inventors: Katherine L. Hall, Westford; Kristin A. Rauschenbach, Lexington, both of Mass.

[73] Assignee: Massachusetts Institute of Technology, Cambridge, Mass.

[21] Appl. No.: 805,012

[22] Filed: Feb. 24, 1997

[51] Int. Cl.⁶ .................................................. G01B 9/02
[52] U.S. Cl. ............................................. 356/345; 385/14
[58] Field of Search ....................... 356/345; 250/227.19, 250/227.27; 385/12, 14

[56] References Cited

U.S. PATENT DOCUMENTS

| | | |
|---|---|---|
| 3,781,081 | 12/1973 | Rokos . |
| 4,128,300 | 12/1978 | Stotts et al. . |
| 4,262,992 | 4/1981 | Berthold, III . |
| 4,762,394 | 8/1988 | Kwong et al. . |
| 4,991,920 | 2/1991 | Peczalski . |
| 5,165,077 | 11/1992 | Rokugawa et al. . |
| 5,208,705 | 5/1993 | Avramopoulos et al. . |
| 5,301,008 | 4/1994 | Huang et al. ............................ 356/345 |
| 5,307,366 | 4/1994 | Auffret et al . |
| 5,309,267 | 5/1994 | Huang et al. ............................ 359/139 |
| 5,353,114 | 10/1994 | Hansen . |
| 5,566,261 | 10/1996 | Hall et al. . |

FOREIGN PATENT DOCUMENTS

3172825 of 1991 Japan .

OTHER PUBLICATIONS

Jinno, M., et al., "Ultrafast all-optical logic operations in a nonlinear Sagnac interferometer with two control beams" vol. 16, No. 4 *Optics Letters,* pp. 220–222 (Feb. 15, 1991).

Jinno, M., et al. "Nonlinear Sagnac Interferometer Switch and Its Applications" vol. 28, No. 4 *IEEE Journal of Quantum Electronics,* pp. 875–882 (Apr., 1992).

Cotter, D., et al. "Algorithm for Binary Word Recognition Suited to Ultrafast Nonlinear Optics" No. 11 *Electronics Letters* (Mar. 8, 1993).

Cotter, et als. "Self–routing of 100 Gbit/s packets using 6 bit 'Keyword' address recognition" *Electronics Letters* (Jun. 8, 1995).

Rogers, D.C., et als. "Demonstration of programmable optical pulse pattern generator for 100 Gbit/s networks" vol. 31, No. 23 *Electronics Letters,* pp. 2001–2002 (Nov. 9, 1995).

Hall, K.L., et al. "All–optical bit pattern generation and matching" vol. 32, No. 13 *Electronics Letters,* pp. 1214–1215 (Jun. 20, 1996).

Hall, K.L., et al. "All–optical bit pattern generation and matching at 10 Gbit/s" vol. 2 *OFC* pp. 133–134 (1996).

*Primary Examiner*—Samuel A. Turner
*Attorney, Agent, or Firm*—Testa, Hurwitz & Thibeault, LLP

[57] ABSTRACT

An optical bit error tester for testing an optical device. The optical bit error tester, in one embodiment, includes an optical bit pattern generator, an optical beam divider in communication with the optical bit pattern generator, the optical device being tested and an optical XOR gate. The optical XOR gate in one embodiment includes a first input port in communication with the beam divider and a second input port in communication with the optical device being tested. The optical XOR gate produces an output signal at its output port in response to changes introduced by the optical device under test in the optical bit pattern produced by the optical bit pattern generator. In one embodiment the optical XOR gate includes a non-linear optical loop mirror.

18 Claims, 3 Drawing Sheets

APPARATUS AND METHOD FOR COMPARING OPTICAL BITS

GOVERNMENT SUPPORT

This invention was made with government support under Contract Number F19628-95-C-0002 awarded by the Department of the U.S. Air Force. The government has certain rights in the invention.

FIELD OF THE INVENTION

The invention relates to a test apparatus for communications systems and more specifically to a test apparatus for optical communications systems.

BACKGROUND OF THE INVENTION

A communications system is expected to reproduce the data input into the system at the output of the system. Such a communication system may have a large number of components, the malfunction of any one of which may affect the integrity of the transmitted signal. Many types of component malfunctions occur only when the system is operated at its intended operating speed and do not occur at low speed testing. For example data drop out, cross-talk, and intersymbol interference occur when the communication system functions at its operating speed and may not occur at lower speeds. As a result, the testing of communications components must of necessity be as close to the operating conditions of the system as possible. In addition different components have characteristic responses that depend on the data rate at which they operate and the length of the data pattern which is input to them.

The operating speeds of ultrahigh speed optical communications systems pose a special challenge to the testing of components at normal operating speeds much greater than is possible for electronic components. Even specialized ultra-high speed electronic testers are expensive and can not test optical systems at the high end of their operating speeds. For example, electronic bit error rate testers typically generate test data patterns with rates only up to 20 Gb/sec.

The present invention attempts to overcome the speed limitations inherent in electronic testers of optical systems.

SUMMARY OF THE INVENTION

The invention relates to an optical bit error tester for testing an optical device. The optical bit error tester, in one embodiment, includes an optical bit pattern generator generating an optical bit pattern, an optical beam divider whose input port is in communication with the optical bit pattern generator; one of whose output ports is in communication with the input port of the optical device being tested and the other of whose input ports is in communication with an optical XOR gate. The optical XOR gate includes a first input port in communication with the other output port of the beam divider and a second input port in communication with the output port of the optical device being tested. The optical XOR gate produces an output signal at its output port in response to changes introduced by the optical device under test in the optical bit pattern produced by the optical bit pattern generator. In one embodiment the optical XOR gate includes a non-linear optical loop mirror.

The invention also relates to a method for testing for optical bit changes introduced by an optical device. The method includes the steps of generating an optical bit pattern, dividing the optical bit pattern into at least a first optical beam and a second optical beam, applying the second optical beam to the input port of the optical device under test, XORing the signal from the optical device under test with the first optical beam, and producing an output signal in response to changes introduced in the optical bit pattern by the optical device as determined by the step of XORing.

BRIEF DESCRIPTION OF THE FIGURES

The foregoing and other objects, features and advantages of the invention will become apparent from the following more particular description of preferred embodiments of the invention, as illustrated in the accompanying figures.

DESCRIPTION OF THE PREFERRED EMBODIMENT

Figure 1:
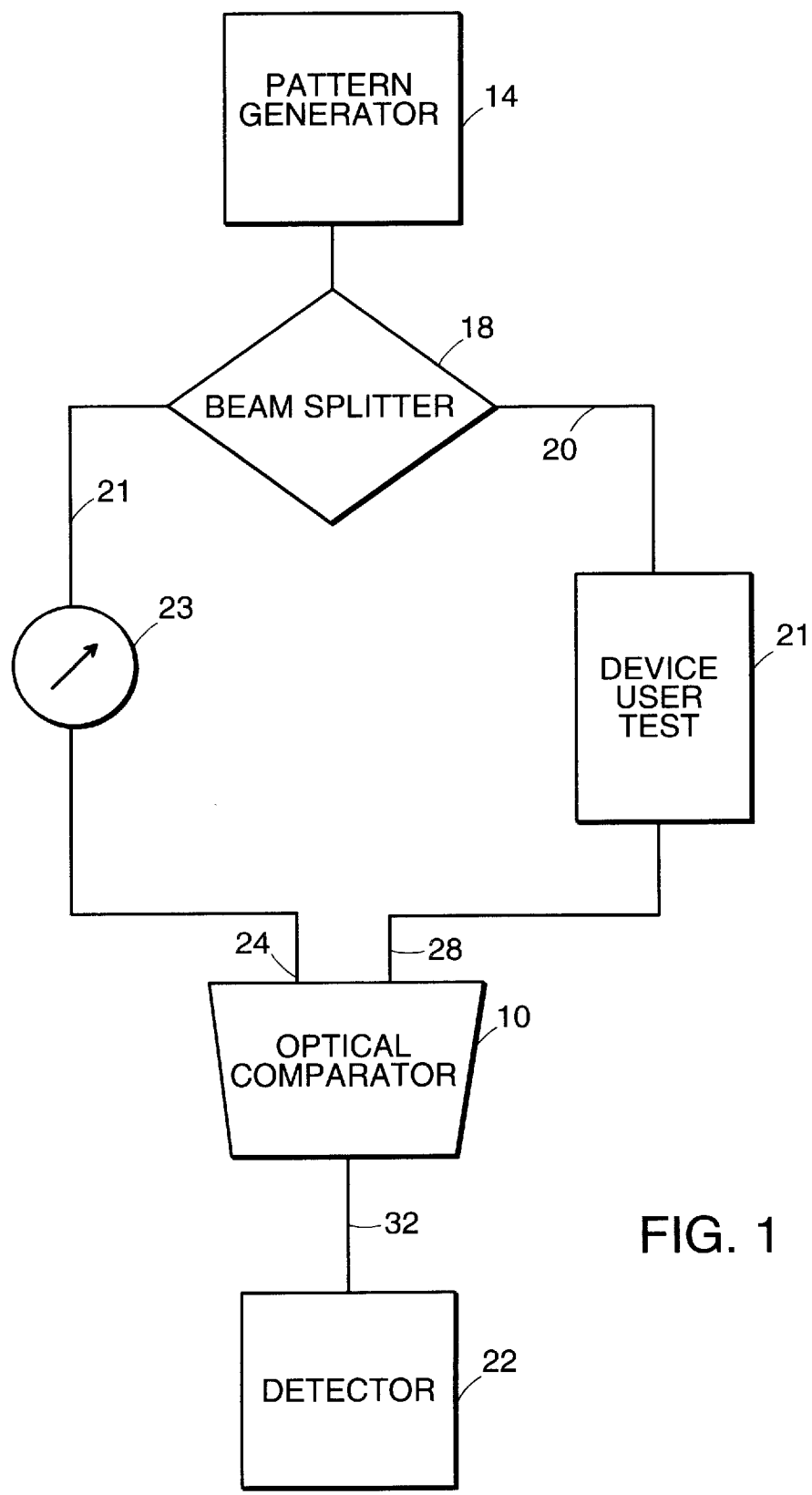
FIG. 1 is a block diagram of an embodiment of the invention.

A block diagram of an embodiment of the invention is shown in FIG. 1. In brief overview, an embodiment of an all optical tester includes an optical comparator 10, an optical pattern generator 14, a beam splitter 18 and a detector 22. The optical pattern generator 14 produces a series of optical pulses each of which is split by the beam splitter 18 into two beams of substantially an identical series of optical pulses. The optical pattern generator 14 may be an optical memory, a photonic optical circuit or any device for generating or storing a multiple pulse optical pattern or for generating a multiple pulse optical pulse pattern from a single input pulse, as is known to one skilled in the art.

One beam from the beam splitter 18 is directed into a first input port 24 of the optical comparator 10, while the other beam is introduced into the input port of the optical device under test 21. The device under test 26 can be complex or simple, and may even simply be a length of optical fiber. The beam leaving the device under test 26 is then directed into a second input port 28 of the optical comparator 10.

It is important initially to match the delay introduced by the optical path arm 20 from the beam splitter 18, including the device under test 26, with the delay in the other optical path arm 21 from the beam splitter 18. To do this a variable optical path element 23 is included in either arm 20, 21 of the beam splitter 18 optical paths. In one embodiment such a variable optical path element 23 is an air gap device mounted on a translation stage but other variable optical path elements known to one skilled in the art may be used.

In general the optical comparator is an optical switch configured as an all optical XOR gate. Such an optical switch may be constructed from any interferometric switch containing an optical non-linearity. As such, interferometers of fiber or semiconductor or any other material known to one skilled in the art may be used. Such an interferometer may also be a generally free space interferometer having a non-linear portion in which the pulses may interact.

The optical comparator 10, in one embodiment, is constructed such that if the pulses of the two beams remain identical, that is, the pulses of the optical beam entering the device under test 26 being unaffected by the device, nothing appears at the output port 32 of the comparator 10 and the detector 22 detects nothing. If however, the pulses in the beam passing into the device under test 26 are affected by the device 26, each affected pulse appears at the output port 32 of the comparator 10 and is detected by the detector 22.

Thus the number of affected pulses can be determined. For the number of affected pulses to be counted accurately the detector 22 must have a response time sufficiently fast enough to detect the individual pulses received from the output port 32.

Figure 2:
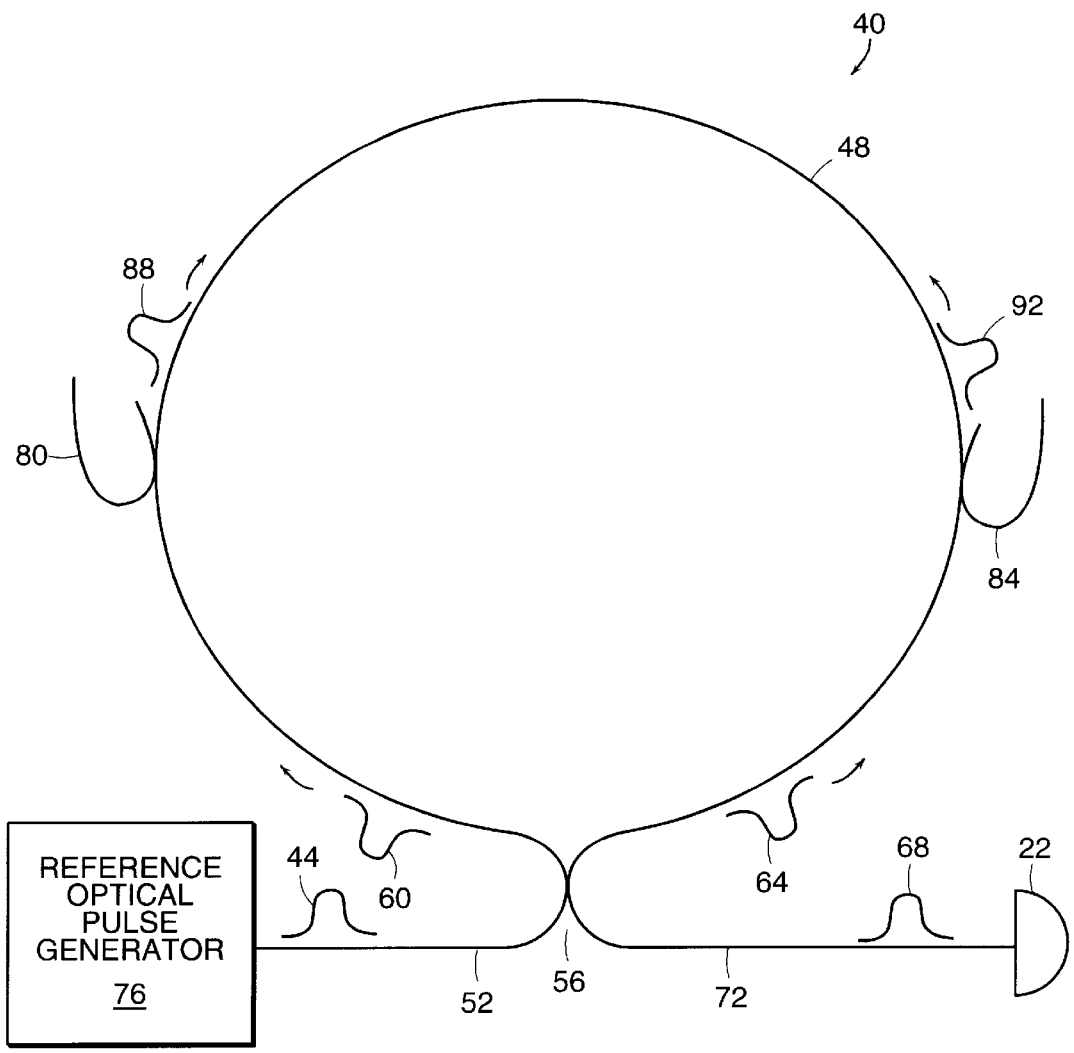
FIG. 2 is a schematic diagram of a Non-linear Optical Loop Mirror, known to the prior art.

Referring to FIG. 2, in one embodiment an optical comparator which may be used in the invention, is in the form of a Sagnac interferometer 40 or a Non-linear Optical Loop Mirror (NOLM). In this embodiment, a pulse 44 from a reference optical pulse generator 76 is introduced into an optical fiber loop 48 from an input port 52 by way of a 50:50 optical coupler 56 or beam splitter. The reference optical pulse generator 76, also referred to as an optical clock, may be constructed from a mode locked laser, a soliton laser or any other optical clock source known to one skilled in the art. The optical coupler 56 splits the pulse 44 into two counter propagating pulses 60, 64 which travel around the loop 48. If both of the pulses 60, 64 are undisturbed during their propagation, they will recombine at the optical coupler 56 and form a single pulse which will leave the loop 48 by passing back out through the input port 52. If either pulse 60, 64 is changed relative to the other pulse 60, 64, such as being phase shifted or simply delayed, a pulse 68 will leave the loop by way of an output port 72 and be detected by a detector 22. The Sagnac interferometer 40 in this embodiment is constructed such that normally all the pulses 44 entering the loop from a reference optical pulse generator 76 traverse the loop 48 and exit from the same port 52 from which they were input Also, in one embodiment, the Sagnac interferometer 40 includes a polarization controller (not shown) in the loop 48 which controls the polarization state of the optical signals in the interferometer.

The Sagnac interferometer in one embodiment is constructed to have two additional loop input ports 80, 84 constructed to inject pulses 88, 92 into the loop in opposite directions. If substantially identical optical pulses 88, 92 are introduced into the loop 48 through the additional loop input ports 80, 84 in opposite directions while the counter propagating pulses 60, 64 from the input port 52 are traversing the loop 48, the counter propagating reference or clock pulses 60, 64 will be affected equally (equivalent to being unaffected) by the additional or control pulses 88, 92 and will again exit the loop 48 through the input port 52 through which they initially entered the loop 48. If however the additional or control pulses 88, 92 are not substantially identical, the interaction of the different additional or control pulses with the reference or clock pulses 60, 64 will cause the reference or clock pulses 60, 64 to be affected unequally and as a result, the affected reference or clock pulse 68 will leave the loop 48 by the output port 72 and be detected by the detector 22. In one embodiment the input port 52 includes a "beam dump" which prevents light exiting through the input port 52 from reaching the reference optical pulse generator 76.

In a preferred embodiment the wavelength of the reference optical pulses or clock pulses differ from the wavelength of the additional or control pulses. Because of this wavelength difference the two types of pulses, additional (control) and reference (clock), travel at different speeds around the loop, permitting the faster pulse to "walk-through" or pass through the slower pulse. This insures an interaction between the two pulse types and reduces the sensitivity of the device to timing differences in the generation of pulses between the reference optical pulse generator 76 and source of the additional or control pulses. In one embodiment the wavelengths of the two types of pulses differ by 10 nm. There is no preference as to which type of pulse has the longer wavelength. Also it is not necessary that the pulses have a different wavelength as long as the timing of the entrance of the pulses into the loop 48 is controlled as described below.

Figure 3:
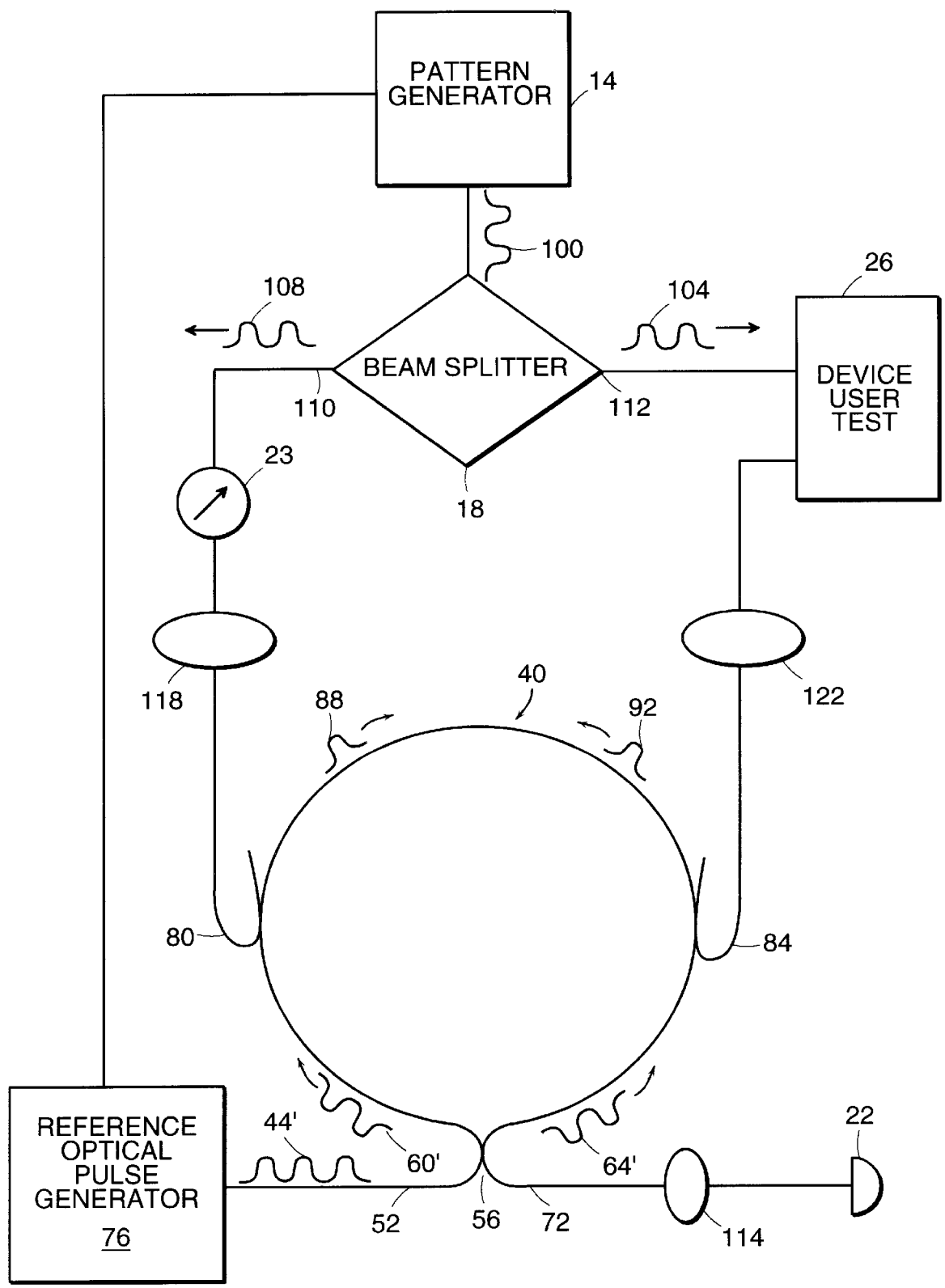
FIG. 3 is a detailed schematic diagram of an embodiment of the invention of FIG. 1 using the Non-linear Optical Loop Mirror shown in FIG. 2 as an optical comparator.

Referring now to FIG. 3, an embodiment of the invention using the Sagnac interferometer 40 shown in FIG. 2, includes an optical pattern generator 14 which may simply be a circulating optical memory as described in U.S. Pat. No. 5,566,261, incorporated herein by reference, connected to an optical beam splitter 18 which in the embodiment shown is a 50:50 optical coupler. The optical beam splitter 18 divides the pulses 100 from the optical pattern generator 14 into two substantially identical series of pulses 104, 108; one series at each of the output ports 110, 112 of the coupler 18. The one of the output ports of the coupler 110 is connected to one of the additional input ports 80 of the loop mirror 40, while the other output port 112 of the coupler 18 is connected to the other additional input port 84 of the loop mirror 40 through the device under test 21. The reference optical pulse generator 76 is connected to the loop mirror 40 through the 50:50 optical coupler 52 of the loop mirror 40. The reference pulse generator 76 provides a series of reference optical pulses 44 at a high frequency. The reference optical pulse generator 76 is in communication with the optical pattern generator 14, so as to provide synchronization between the optical pulses entering the loop 48 from each. If synchronization is maintainable, the wavelength difference in the additional or control pulses and the reference or clock pulses may be zero.

As explained above, the reference optical pulses 44 enter the optical loop 40 through the 50:50 optical coupler 56 and are split into two counter propagating series of pulses 60, 64'. If there are no input optical pulses 104, 108 injected into the loop 48 through the additional input ports 80, 84 of the loop 48 or if the pulses 104, 108 injected into the optical loop 48 through the additional optical input ports 80, 84 are substantially identical and synchronized, the reference optical pulses 44 are unaffected or equally affected, respectfully, and pass from the loop 48 through the input port 52 through which they were injected into the loop 48. In one embodiment, the optical pulses 88, 92 entering the loop 48 through additional input ports 80, 84 are passed through filters 118, 122 to remove any extraneous light emission from the data streams.

If the series of pulses 104 derived from the pattern generator 104 which passes through the device under test 21 is changed in some way by the device 21, the additional optical pulses 92 will affect the counter propagating reference pulses 64' unequally, and the effected pulses will leave the loop 48 through the output port 72 and be detected by the detector 22 after passing through filter 114. The filter 114 removes optical pulses 88, 92 from the output stream, thereby to differentiate them from reference pulses 44. By connecting a counter to the output of the detector 22, the number of pulses affected can be determined for a predetermined number of input pulses.

While the invention has been particularly shown and described with reference to specific preferred embodiments, it should be understood by those skilled in the art that various changes in form and detail may be made therein without departing from the spirit and scope of the invention as defined by the appended claims.

What is claimed:

1. An optical bit error tester for testing an optical device, said optical device including an input port and an output port, said optical bit error tester comprising:

an optical bit pattern generator generating an optical bit pattern at an output port;

an optical beam divider comprising an input port, a first output port and a second output port, said input port of said optical beam divider in communication with said output port of said optical bit pattern generator and said second output port of said optical beam divider in communication with said input port of said optical device being tested; and an optical XOR gate comprising a first input port, a second input port, and an output port, said first input port of said optical XOR gate in communication with said first output port of said optical beam divider, and said second input port of said optical XOR gate in communication with said output port of said optical device being tested, said optical XOR gate producing an output signal at said output port of said optical XOR gate in response to changes introduced in said optical bit pattern by said optical device.

2. The optical bit error tester of claim 1 wherein said optical bit pattern generator is an optical memory.

3. The optical bit error tester of claim 1 wherein said optical XOR gate comprises a nonlinear optical loop mirror.

4. The optical bit error tester of claim 3 wherein said nonlinear optical loop mirror comprises an optical fiber.

5. The optical bit error tester of claim 3 wherein said nonlinear optical loop mirror comprises a semiconductor.

6. The optical bit error tester of claim 1 wherein said optical XOR gate comprises an interferometer.

7. The optical bit error tester of claim 6 wherein said interferometer comprises a Mach-Zen de r interferometer.

8. The optical bit error tester of claim 1 wherein said optical beam divider is a beam splitter.

9. The optical bit error tester of claim 1 wherein said optical beam divider is a fiber optic coupler.

10. An optical bit comparator comprising:

an optical memory storing an optical bit pattern and producing said optical bit pattern at an output port; and an optical XOR gate comprising a first input port, a second input port, and an output port, said first input port of said optical XOR gate in communication with said output port of said optical memory, and said second input port of said optical XOR gate in communication with an output port of a data source having a data pattern to be compared with said stored optical bit pattern, said optical XOR gate producing an output signal at said output port of said optical XOR gate in response to said optical bit pattern and said data pattern.

11. The optical bit comparator of claim 10 wherein said optical XOR gate comprises a nonlinear optical loop mirror.

12. The optical bit comparator of claim 11 wherein said nonlinear optical loop mirror comprises an optical fiber.

13. The optical bit comparator of claim 11 wherein said nonlinear optical loop mirror comprises a semiconductor.

14. The optical bit comparator of claim 10 wherein said optical XOR gate comprises an interferometer.

15. The optical bit comparator of claim 14 wherein said interferometer comprises a Mach-Zender interferometer.

16. The optical bit comparator of claim 10 wherein said optical bit pattern comprises an address, said data source comprises an optical communications network and said data pattern comprises a network address.

17. A method for testing for optical bit changes introduced by an optical device, said optical device including an input port and an output port, said method comprising:

generating an optical bit pattern;

dividing said optical bit pattern into at least a first optical beam and a second optical beam;

applying said second optical beam to said input port of said optical device;

XORing a signal from said output port of said optical device with said first optical beam; and producing an output signal in response to changes introduced in said optical bit pattern by said optical device as determined by the step of XORing.

18. A method for comparing an predetermined optical bit pattern with a data bit pattern, said method comprising:

providing said predetermined optical bit pattern; and

XORing said predetermined optical bit pattern with said data bit pattern, producing an output signal in response to said predetermined optical bit pattern
and said data pattern as determined by the step of XORing.

* * * * *